(No Model.) 2 Sheets—Sheet 1.
J. W. MARSH.
ELECTRIC CONNECTION.
No. 558,971. Patented Apr. 28, 1896.
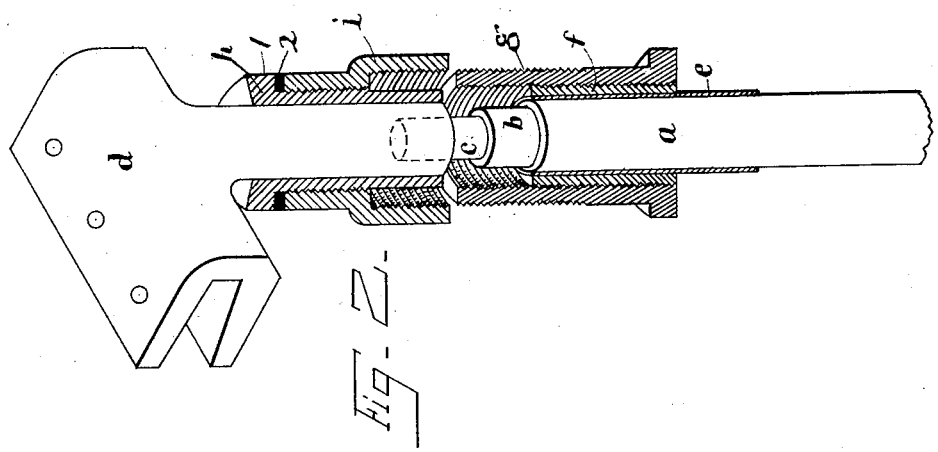
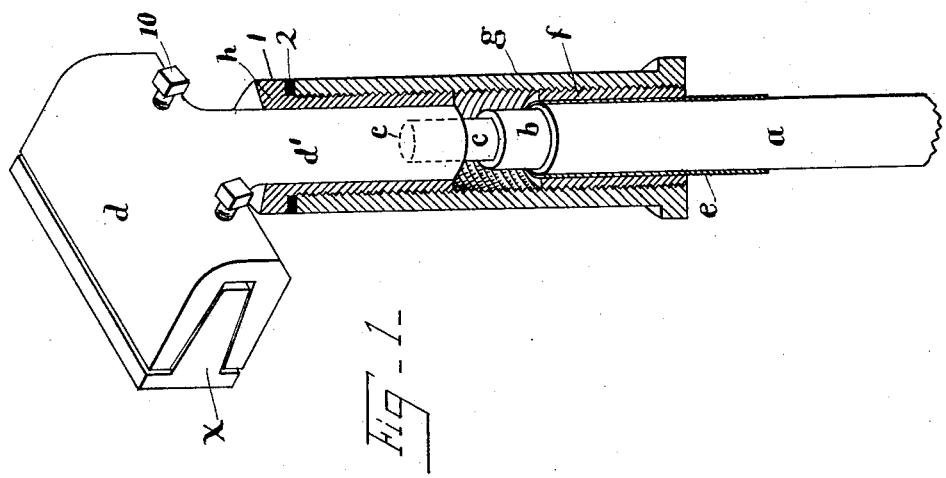
WITNESSES:
S. Wenthal.
A. V. Bourke.
INVENTOR
Joseph W. Marsh
BY
Philipp Iwanson & Phelps
ATTORNEYS

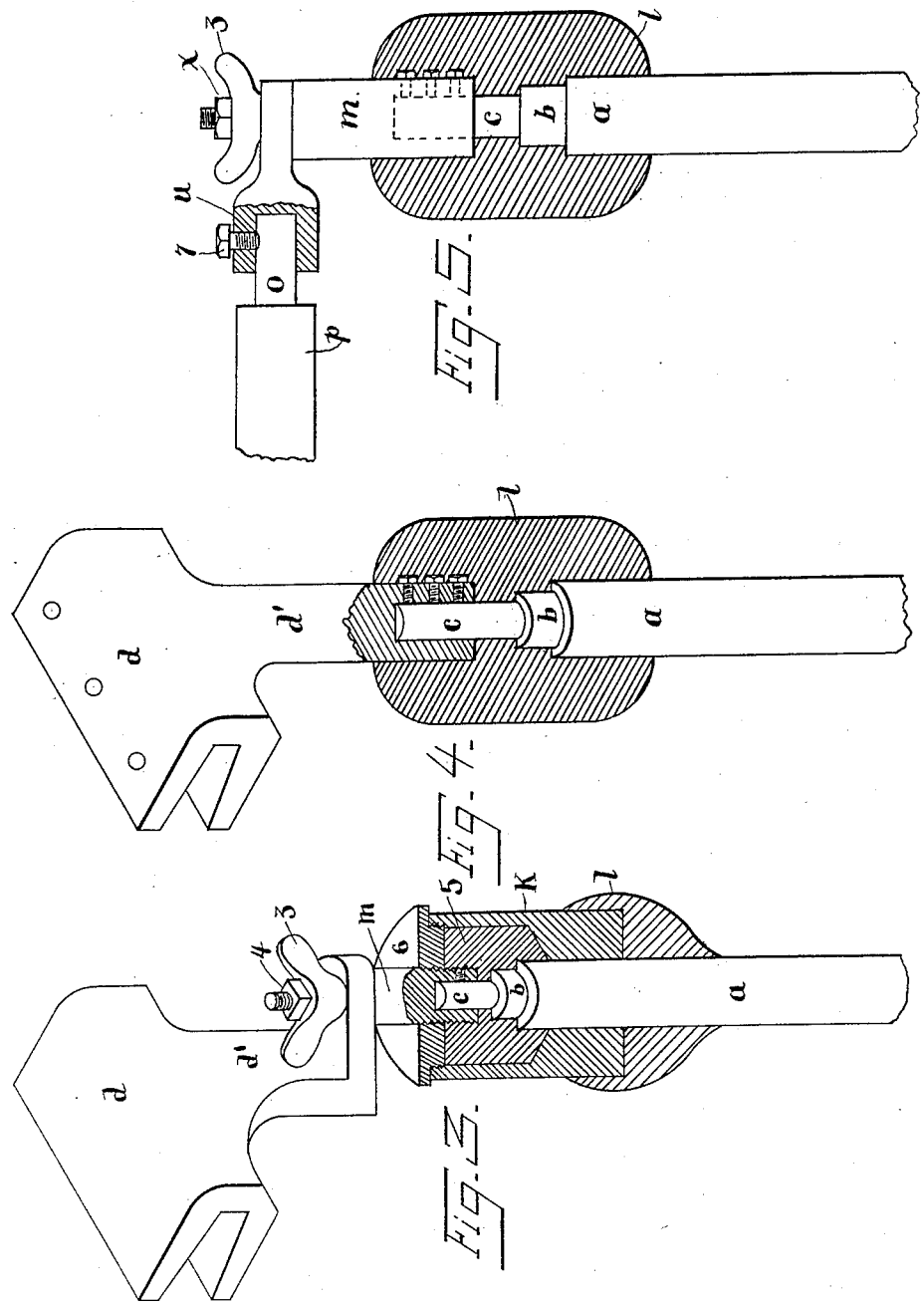

UNITED STATES PATENT OFFICE.

JOSEPH W. MARSH, OF PITTSBURG, PENNSYLVANIA, ASSIGNOR TO THE STANDARD UNDERGROUND CABLE COMPANY, OF SAME PLACE.

ELECTRIC CONNECTION.

SPECIFICATION forming part of Letters Patent No. 558,971, dated April 28, 1896.

Application filed May 6, 1895. Serial No. 548,247. (No model.)

*To all whom it may concern:*

Be it known that I, JOSEPH W. MARSH, a citizen of the United States, residing at Pittsburg, county of Allegheny, and State of Pennsylvania, have invented certain new and useful Improvements in Electric Connections, fully described and represented in the following specification and the accompanying drawings, forming a part of the same.

The object of the present invention is to provide a simple and efficient means for connecting and disconnecting feeder-cables or branches to and from a trolley-line, the especial object of the invention being to provide an efficient means of protecting the feeder-cable at such points against deleterious action of moisture in the case of fiber-insulated cables and of moisture, acid, or atmospheric disintegration in the case of rubber or gutta-percha insulated cables.

While the invention is applicable to both overhead and underground trolley-lines, it is of especial value in connection with the latter.

For a full understanding of the invention a detailed description of constructions embodying all the features of the same in their preferred form and certain modifications thereof will now be given in connection with the accompanying drawings, forming a part of this specification, and the features forming the invention will then be specifically pointed out in the claims.

In the drawings, Figure 1 shows a construction of the preferred form embodying all the features of the invention. Fig. 2 shows a slight modification thereof. Figs. 3, 4, and 5 show other constructions embodying some of the broad features of the invention.

Referring now especially to Fig. 1, $a$ is the metallic sheath of the cable; $b$, the insulation; $c$, the cable-conductor, and $d$ the clamp or connector to which the cable is to be connected, this connector being shown as of a forked form suitable for use in underground trolley systems for engaging a T or L rail forming the trolley-conductor, this connector having a shank $d'$, which is provided with an opening to receive the conductor $c$. In the construction shown in this figure the end of the sheath $a$ receives a metal tube $e$ on which is molded a sleeve $f$, of mica compound or similar moldable insulating material, and this sleeve is screw-threaded on the outside and adapted to receive a metal gland $g$ screwed thereon. The shank $d'$ is also provided with a sleeve $h$ of molded mica compound or similar moldable insulating material onto which the metal gland $g$ screws, this sleeve $h$ being preferably provided with a shoulder 1, against which is seated a rubber gasket 2, which receives the end of the metal gland $g$ when the connection is complete. When the connection is to be made, the end of the cable is prepared by stripping the sheath and insulation off the conductor $c$ a short distance so as to bare the latter, as shown. The metal tube $e$, with its sleeve of threaded mica compound or similar material $f$, is then slipped over the sheath $a$, the metal tube $e$ preferably fitting snugly and being soldered or otherwise secured moisture-tight to the sheath at its lower end. The metal gland $g$ is then screwed onto the threaded mica compound and down upon it until the upper end of the gland is brought about level with or below the upper end of the sleeve $f$, so as to give access to the conductor $c$. The cable-conductor $c$ is then secured in the socket at the lower end of the shank $d'$ by soldering or otherwise, as usual in such constructions, and the metal gland $g$ is then screwed upward to and upon the sleeve $h$, so as to seat against the rubber gasket 2, thereby making the moisture-tight joint more certain than it would be made by the screw-contact between the parts. It will be understood, however, that the shoulder 1 and gasket 2 are not absolutely essential and may be omitted. It will be seen that this provides a very efficient construction by which the insulation of the conductor is entirely inclosed and protected from moisture, acid, or gases, and which may be applied directly to a cable of ordinary form, it being necessary only to provide the connector and metal tube $e$ with the molded-mica sleeves, which may be done at the mica-compound factory and these parts then shipped to the place of use. If, for any reason, it is not desired to use the metal tube $e$, it will be understood that the mica-compound sleeve $f$ may be molded directly to the cable-sheath $a$, and in cases where this can be done conveniently it may be found preferable.

Thus a short piece of the branch cable—say one foot or more—could be used in preparing the device and have the mica-compound sleeve cast thereon, and this short piece of cable could be spliced upon the cable with which connection is to be made by the ordinary sleeve-joint, or the mica-compound molding-press may be used at the place where the connection is made and the mica compound applied directly to the cable. This figure shows also a feature of connector construction which forms a part of the invention. In this construction the forks of the connector $d$ are inclined and a wedge-shaped conductor $x$ is used, the two parts being drawn together by one or more screws 10 in the connector entering the thin edge of the wedge. By this construction the wedge-conductor may be drawn in so as to force both the inclined contact-surfaces of the wedge into close contact with the inclined surfaces of the forked connector and assure good contact.

In Fig. 2 I have shown a slightly-modified construction, in which the mica-compound sleeve $h$ is threaded through only a portion of its length, and a metal socket $i$ is used, which is screwed onto the mica compound and seated against the rubber gasket 2 and enlarged at its lower end and screw-threaded on the inside so as to receive the metal gland $g$, which is screw-threaded on the outside to enter it.

In Figs. 3 to 5 I have shown constructions in which the mica compound or similar moldable insulating material is molded directly to the cable-sheath, involving the use of a short section of cable, as above described, or the application of the mica compound or other material at the place where the connection is being made.

In the construction shown in Fig. 3 the sheath $a$ and the cup $k$ are united by a mass of molded mica compound or similar insulating material $l$, the conductor $c$ being connected within the cup to a post $m$, which is threaded at its lower and upper parts, said upper part being reduced in size and passing through an opening in a flat end of the shank $d'$ on the connector $d$ and secured by a thumb-nut 3 and set-nut 4. The cup $k$ is filled with an insulating compound 5 about the conductor and lower end of the post $m$, and the cup is closed by a cap 6, which is preferably screwed onto the post $m$, as shown, this cap preferably being made of hard rubber and provided with screw-threads on its rim to screw into the top of the cup $k$, so as to form a tight joint, the mass of molded material $l$ making a tight joint between the cable-sheath and cup, so that the conductor is fully inclosed and protected, as in the previous constructions.

In Fig. 4 is shown a construction in which the bared conductor $c$ enters an opening in the end of the connector-shank $d'$, as in the construction shown in Fig. 1; but the joint is protected simply by a mass of mica compound or other insulating material $l$, molded directly about the cable-sheath, insulated conductor, and connector-shank. In using this construction, if there is any likelihood of exposure of the insulation $b$ between the time of preparing the end of the cable for the mica compound and its actual application the insulation should be carefully protected by rubber tape or other suitable means.

In Fig. 5 I have shown a construction similar to Fig. 4, so far as the molded mass $l$ is concerned, this figure, however, showing the application of this feature of the invention in the form most suitable for connection with overhead trolley-wires, the post $m$, thumb-nut 3, and set-nut 4 of the construction shown in Fig. 3 being employed and connection being made thereby to a connector $n$, provided with a hole large enough to receive the trolley-tap $o$, provided with the insulation $p$, as usual in such constructions, the tap being secured by a screw 7 or solder, or both.

It will be understood that various other modifications may be made in applying the broad features of the invention and that I am not to be limited to the specific construction of any of the devices shown.

It will be understood also that the invention may be applied also to cable connections in other constructions than trolley-lines, although especially designed for the latter.

The mica compound herein referred to as the preferred material for carrying out the invention is a compound of fine mica with one or more suitable binding materials, forming a moldable material which, when hardened by vulcanization or otherwise, is insoluble in water and is not affected by temperatures likely to be encountered in underground or overhead lines, and which is strong enough to stand the strain and pressure to which it would be subjected when used as herein described. Such a material, which is well adapted for my purpose, is described in United States Letters Patent No. 551,230. There are other insulating materials, however, well known as used for other purposes, which have the qualities above stated and therefore are the equivalent of mica compounds when used in carrying out my invention, and by the term "similar moldable insulating material" used in the claims I mean and intend to cover only moldable insulating material possessing these qualities. It will be noted that such materials when used in accordance with this invention act not only to protect the end of the cable from the action of moisture and gases and to insulate, but also form a part of the connection, giving strength thereto and taking the place of additional parts heretofore necessary in such constructions, thus improv- and simplifying the connection.

What I claim is—

1. An electrical connection provided with a moisture and gas excluding covering having mica compound or similar moldable insulating material molded to form a tight joint between parts of the connection, substantially as described.

2. An electrical connection provided with a protecting-covering having mica compound or similar moldable insulating material molded directly to one or both of the members to be connected, and forming a tight joint between parts of the connection, substantially as described.

3. The combination with a cable and connector, of a protecting-covering for the connection between the table and connector having mica compound or similar moldable insulating material molded directly to one or both of the members to form a tight joint, substantially as described.

4. The combination with a cable and connector, of a protecting-covering having the joints between the members formed by mica compound or similar moldable insulating material, substantially as described.

5. The combination with a cable and connector, of a protecting-covering having mica compound or similar moldable insulating material molded directly on the connector to form a tight joint, substantially as described.

6. The combination with a cable and connector, of sleeves of mica compound or similar moldable insulating material molded to form tight joints between parts of the connection, and a gland secured to said sleeves and inclosing the joint between the cable and connector, substantially as described.

7. The combination with a cable and connector, of threaded sleeves of mica compound or similar moldable insulating material molded to form tight joints between parts of the connection, and a gland screwed onto said sleeves and inclosing the joint between the cable and connector, substantially as described.

8. The combination with a cable and connector, of a threaded sleeve of mica compound or similar moldable insulating material molded directly to the connector, a threaded sleeve of mica compound or similar moldable insulating material carried by the cable and forming a tight joint between parts of the connection, and a gland screwed onto said sleeves and inclosing the joint between the cable and connector, substantially as described.

9. The combination with a cable and connector, of threaded sleeves $f$, $h$ of mica compound or similar moldable insulating material, one of said sleeves being molded directly to the connector, shoulder 1 on said sleeve, and a gland on said sleeves seated against said shoulder, substantially as described.

10. The combination with a cable and connector, of metal sleeve $e$ on the cable, threaded sleeve $f$ of mica compound or similar moldable insulating material molded on said sleeve, sleeve $h$ of mica compound or similar moldable insulating material molded on the connector, and a gland screwed onto said sleeves, substantially as described.

11. The combination with the forked connector having inclined contact-surfaces, of a wedge-shaped contact-piece, and one or more screws for forcing the contact-piece edgewise between the forks, substantially as described.

In testimony whereof I have hereunto set my hand in the presence of two subscribing witnesses.

JOSEPH W. MARSH.

Witnesses:
 JAMES R. WILEY,
 DAVID B. GERRETT.